(12) United States Patent
Hewatt

(10) Patent No.: US 6,327,922 B1
(45) Date of Patent: Dec. 11, 2001

(54) GYROSCOPIC CONTINUOUSLY VARIABLE TRANSMISSION

(75) Inventor: Chris B. Hewatt, 14 Inverness Dr., East, B136, Englewood, CO (US) 80112

(73) Assignee: Chris B. Hewatt, Englewood, CO (US)

( * ) Notice: Subject to any disclaimer, the term of this patent is extended or adjusted under 35 U.S.C. 154(b) by 0 days.

(21) Appl. No.: 09/437,536

(22) Filed: Nov. 10, 1999

(51) Int. Cl.[7] ................................................ F16H 33/10
(52) U.S. Cl. ............................ 74/5 R; 74/64; 475/267
(58) Field of Search .............................. 74/64, 5 R, 83, 74/655 A, 655 B; 475/218, 267, 268

(56) References Cited

U.S. PATENT DOCUMENTS

| | | | |
|---|---|---|---|
| 2,031,286 | * | 2/1936 | Stern et al. ........................ 475/268 |
| 2,183,460 | * | 12/1939 | Lenox ................................ 475/268 |
| 2,296,654 | * | 9/1942 | Stein et al. ........................ 475/268 |
| 2,390,341 | | 12/1945 | Williams . |
| 2,811,050 | * | 10/1957 | Prichard ............................ 475/268 |
| 2,960,889 | | 11/1960 | Keyser . |
| 3,153,353 | * | 10/1964 | Voigt ................................. 475/268 |
| 3,203,644 | | 8/1965 | Kellogg, Jr. . |
| 3,673,875 | | 7/1972 | Kasselmann . |
| 3,756,337 | | 9/1973 | Schroeder et al. . |
| 3,756,338 | | 9/1973 | Goodridge . |
| 3,769,845 | | 11/1973 | Nocek . |
| 4,161,889 | | 7/1979 | Hinds . |
| 4,169,391 | | 10/1979 | Schonberger . |
| 4,295,381 | | 10/1981 | Hinds . |
| 4,361,055 | | 11/1982 | Kinson . |
| 4,498,015 | | 2/1985 | Gottfried . |
| 4,641,550 | | 2/1987 | Meyman . |
| 4,791,815 | | 12/1988 | Yamaguchi et al. . |
| 4,879,918 | | 11/1989 | Hojo et al. . |
| 4,957,282 | | 9/1990 | Wakefield . |
| 5,109,719 | | 5/1992 | Piokins, Jr. . |
| 5,133,515 | | 7/1992 | Strattan et al. . |
| 5,133,517 | | 7/1992 | Ware . |
| 5,243,868 | | 9/1993 | Schonberger . |
| 5,489,001 | | 2/1996 | Yang . |

FOREIGN PATENT DOCUMENTS

9185998 * 2/1947 (FR) ..................................... 475/268

* cited by examiner

Primary Examiner—David A. Bucci
Assistant Examiner—William C Joyce
(74) Attorney, Agent, or Firm—Sheridan Ross P.C.

(57) ABSTRACT

The present invention is directed to an infinitely variable transmission system that includes a gyroscope and a rotatable gear assembly to translate torque from an input power shaft to an output power shaft.

19 Claims, 2 Drawing Sheets

GYROSCOPIC CONTINUOUSLY VARIABLE TRANSMISSION

FIELD OF THE INVENTION

The present invention relates generally to transmission systems and specifically to a gyroscopic, infinitely or continuously variable mechanical power transmission system.

BACKGROUND OF THE INVENTION

Transmissions are widely employed on a wide variety of mechanized devices, including motor vehicles, construction machinery, excavation machinery, small electric motors, and the like. Manual and automatic transmissions, also known as speed changers or torque converters, typically employ gears, hydraulics, or friction to control transfer of torque from a power source to a load.

Conventional transmissions suffer from numerous problems. Transmissions generally have low mechanical and energy efficiencies, particularly when operating over the full range of output power requirements generally required in normal applications. Transmissions typically operate efficiently only at or near the output speeds corresponding to the input-to-output rotational speed ratios designed into the device. Additional mechanical and energy inefficiencies can result from the operational demands for starts, stops, and accelerations. Transmissions generally have slow response times, are bulky and/or heavy, are complex, and/or lack robustness.

Considerable resources have been expended towards developing a more energy efficient and operationally effective transmission system that overcomes these numerous problems. These efforts have been largely unsuccessful due to the need to make unacceptable compromises in cost, weight, and operational complexity to overcome mechanical and/or design limitations.

SUMMARY OF THE INVENTION

Objectives of the present invention include providing a transmission system that is continuously or infinitely variable, adaptable to wide ranges of use, is more mechanically and energy efficient, is inexpensive, has a fast response time, is small and/or lightweight, is capable of delivering maximum power on the one hand while operating efficiently and effectively through a wide range of power demands on the other, is robust and is operationally simple in design.

In a first embodiment, the transmission system includes:

(a) first and second input power shafts, the first input power shaft engaging the second input power shaft;

(b) a frame disposed to be rotated about a third shaft, the frame including a gyroscopic member, the gyroscopic member being rotated about an axis of rotation when torque is applied to the first input power shaft, the axis of rotation being transverse to a longitudinal axis of the third shaft; and (c) a gear assembly rotatably disposed about an output power shaft. The gear assembly is engaged with the output power shaft, the second input power shaft, and the third shaft such that rotation of the gyroscopic member about the axis of rotation resists rotation of the frame by the gear assembly, thereby causing at least a portion of the torque applied to at least one of the first and second input power shafts to be transferred to the output power shaft.

The transmission system is particularly useful as an continuously or infinitely variable, mechanical power transmission, speed changer or torque converter. The system is capable of transmitting automatically a wide range of output torques by continuously or infinitely variable input-to-output speed ratios without the switching of gears or a torque converter; automatically delivering the output torques at the most appropriate input-to-output rotational speed ratio(s) relative to the output power needs, thereby ensuring power transmission at maximum efficiency and effectiveness; delivering output power torques over a wide range of output power requirements without the need for components such as bands, brakes, clutches, hydraulic torque converters, and special starters (which may require periodic adjustment, frequent maintenance, or replacement); transmitting extremely high horsepowers, achievable by high input-to-output speed ratios, with a transmission of nominal size and weight for the purpose of starting and moving extremely heavy vehicular loads such as heavy duty trucks, locomotives, and other types of heavy equipment; and achieving these results while maintaining a simple design, a light weight, a small cubature, a low cost of manufacture, and a robust construction.

The gyroscopic member can be any structure including one or more symmetrical disks, which are typically relatively heavy (e.g., 150 pounds or more), disposed concentrically about a central shaft (having the axis of rotation as its longitudinal axis) that is free to rotate about the axis of rotation which itself is confined within the frame. In other embodiments, the frame includes nested subframes that are free to rotate about one or more axes (i.e., have one or more degrees of freedom). The gyroscopic member has an axis of rotation that remains fixed with respect to space and will resist directional movement. The gyroscopic member can deliver a torque that is proportional to the angular velocity of the frame about an axis perpendicular to the gyroscope's axis of rotation. Under the principle of conservation of angular momentum, the total angular momentum of any system of particles relative to any point fixed in space remains constant, provided no external force(s) act on the system.

In certain embodiments, the resistance of the frame (i.e., the gyroscope's axis of rotation) to being rotated about the third shaft is attributable to the phenomenon of precession. This phenomenon is explained by Newton's law of motion for rotation under which the time rate of change of angular momentum about any given axis is equal to the torque applied about the given axis. Stated another way, the rate of rotation of the axis of rotation about a transversely oriented axis is proportional to the applied torque. This phenomenon is explained in detail below with reference to FIG. 1.

The gear assembly can include a number of interlocked gears and a number of parallel, rotatably mounted shafts to facilitate transmission of torque applied about the second input power shaft to the output power shaft.

In one specific configuration, the gear assembly includes a first gear at a proximal end of the gear assembly and a plate at a distal end of the gear assembly. The first gear and plate are rotatably mounted on different shafts (e.g., the second input power shaft and the output power shaft, respectively). The third shaft is attached to a second gear that engages the first gear. A fourth shaft and a fifth shaft are rotatably mounted on the first gear and plate.

A number of gears in the gear assembly are employed to more efficiently transmit torque from the input power shafts to the output power shaft. In an illustrative configuration, a third gear is attached to the second input power shaft, the third gear engages a fourth gear mounted on one of the fourth and fifth shafts, a fifth gear attached to the one of the fourth and fifth shafts engages a sixth gear on the other of the one of the fourth and fifth shafts, and a seventh gear attached to the other of the one of the fourth and fifth shafts engages an eighth gear mounted on the output power shaft.

The relative sizes of the gears in the gear assembly are important to the efficiency of the transmission. Preferably, the first gear is larger than the second gear, the third gear is smaller than the fourth gear, the fourth gear is smaller than a fifth gear, and the sixth gear is larger than the seventh gear.

To maximize resistance to rotation of the gear assembly by the gyroscopic member, the second gear is preferably significantly smaller than the first gear. Preferably, the gear ratio of the first gear to the second gear is at least about 2:1 and more preferably is at least about 3:1.

In another embodiment, the transmission system includes:
(a) a frame mounting a gyroscopic member, the gyroscopic member disposed to be rotated about an axis of rotation in response to rotation of an input power shaft, when torque is applied to the input power shaft; and
(c) a gear assembly rotatably engaged with an output power shaft and the input power shaft, such that the gear assembly is rotatable about the output power shaft in response to a power load on the output power shaft. Rotation of the gyroscopic member about the axis of rotation resists rotation of the gear assembly, thereby causing at least a portion of the torque applied to the input power shaft to be transferred to the output power shaft.

In yet another embodiment, a method of operation of a transmission system is provided. The method includes the steps of:
(a) applying torque to the input power shaft;
(b) rotating a gyroscopic member in response to the applying step, the gyroscopic member having an axis of rotation and being mounted on a frame member;
(c) rotating a gear assembly in response to the applying step, the gear assembly engaging the input power shaft and the output power shaft; and
(d) rotating the frame member and the axis of rotation of the gyroscopic member about a shaft engaging the gear assembly. Rotation of the axis of rotation resists rotation of the gear assembly. In this manner, at least a portion of the torque is applied to the output power shaft.

In one process configuration, the gyroscopic member is rotated by the engagement of a first gear attached to the input power shaft with a second gear attached to the gyroscopic member. In another process configuration, the gear assembly is rotated by the engagement of a third gear attached to the input power shaft with a fourth gear attached to a third shaft rotatably mounted on a fifth gear. In yet another process configuration, the frame member and axis of rotation are rotated by the engagement of a sixth gear attached to the shaft with the fifth gear.

In yet another process configuration, the gear assembly includes fourth and fifth shafts, which are parallel to one another and are mounted on common surfaces of the gear assembly. The fourth and fifth shafts are rotated to transmit torque applied to the input power shaft to the output power shaft.

DETAILED DESCRIPTION

Figure 2:
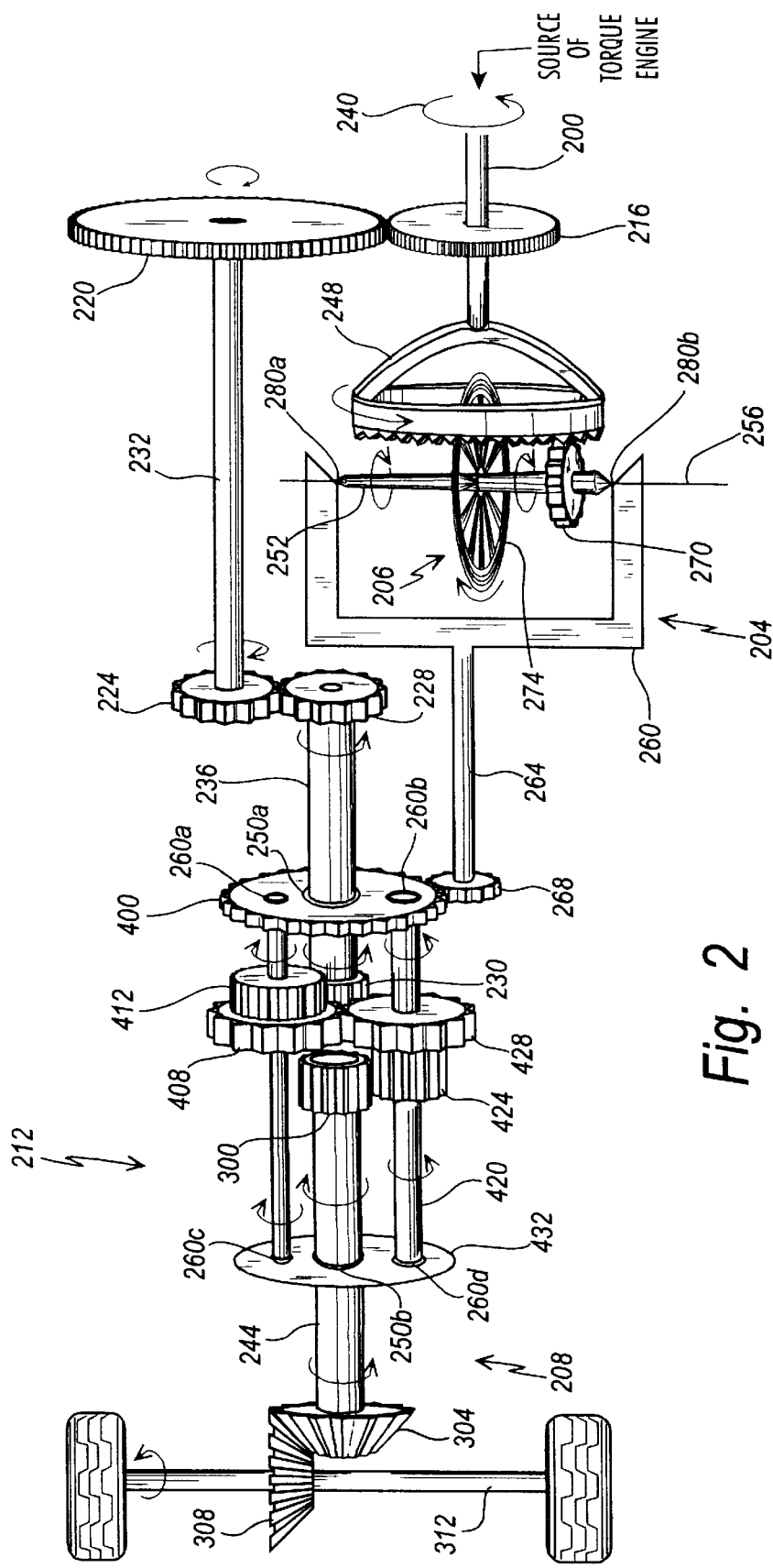
FIG. 2 is a plan view of a transmission system for a motor vehicle according to an embodiment of the present invention.

FIG. 2 is a plan views of a transmission system for a motor vehicle according to an embodiment of the present invention. FIG. 2 is not drawn to scale. The transmission system includes a source of input torque (not shown) engaged with an input power shaft 200, a gyroscope assembly 204, a drive train assembly 208, and a rotating gear assembly or clutch assembly 212 engaged with the drive train assembly 208 for the vehicle. The gear assembly 212 is engaged with the input power shaft 200 via drive gears 216, 220, 224, 228, and 230 which are positioned on primary and secondary drive shafts 232 and 236, respectively. A drive gear 216 located on the input power shaft 200 engages drive gear 220 to transfer a portion of the input torque 240 to the various drive shafts 232 and 236, the gear assembly 212, and ultimately to the output power shaft 244.

The gyroscope assembly 204 includes a gyro gear 248 for rotating the gyroscope 206 about the rotational shaft 252 having an axis of rotation 256 (which is generally coincident with the longitudinal axis of the shaft 252), a frame 260 to support the gyroscope 206, and a gyro shaft 264 and attached gear 268 to resist rotation of the frame 260 by the gear assembly 212. The gyroscope 206 preferably has a weight ranging from about 150 to about 250 pounds, with most of that weight being attributable to the rotor. The gyroscope 206 includes a rotational gear 270 that engages the gyro gear 248 to cause rotation of a rotor 274 attached to the shaft 252 about the axis of rotation 256. The gear ratio of the gyro gear 248 to the rotational gear 270 is preferably at least about 4:1 (i.e., 1 rotation of gyro gear 248 equals about 4 rotations of rotational gear 270) and more preferably at least about 6:1. The shaft 252 of the gyroscope 206 is supported on the frame 260 by bearings or any other suitable attachment mechanism located at either end 280a,b of the shaft 252.

The drive train assembly of 208 includes an output power shaft 244 that includes a drive gear 300 and a first bevel gear 304 that engages a second bevel gear 308 attached to the axle 312.

The gear assembly 212 includes a master gear 400; a first gear shaft 404 attached to gears 408 and 412, a second gear shaft 420 attached to gears 424 and 428, and a plate 432. The master gear 400 is rotatably mounted on the secondary drive shaft 236 and the plate 432 on the power output shaft 244 by bearings 250a,b or other suitable device(s). These rotational mountings permit the gear assembly 212 to rotate about a rotational axis that is generally aligned (coincident) with the longitudinal axes of the secondary drive shaft 236 and the output power shaft 244. The first and second gear shafts are rotatably mounted on the plate 432 and master gear 400 by bearings 260a–b or other suitable devices located at either end of each shaft.

The relative sizes of the various interlocking gears can be important to the mechanical and energy efficiency of the system. The drive gear 216 is smaller than the drive gear 220 to transfer a substantial portion of the torque to the various drive shafts. Preferably the gear ratio of drive gear 220 to drive gear 216 ranges from about 1:2 to about 1:3. The preferred gear ratios of drive gear 224 to drive gear 228 is about 1:1. The preferred gear ratio of gyro gear 248 to rotational gear 270 ranges from about 1:1 to about 1:2. The preferred gear ratio of master gear 400 to gear 268 is at least about 1:2 and more preferably ranges from about 1:5 to about 1:3. Regarding the gear ratios of the gears in the gear assembly, the preferred gear ratio of gear 412 to the drive gear 230 is about 1:1; of gear 408 to gear 428 is about 1:1;

of gear 424 to the drive gear 300 ranges from about 1:1. The gear ratio of gear 408 to gear 412 and of gear 428 to the fourth gear 424 preferably ranges from about 1:2 to about 1:3.

The operation of the transmission system will now be described with reference to FIG. 2. Upon application of input torque 240 about the input power shaft 200 by a motor (not shown), the various gears and shafts rotate in the directions shown. The gyro gear 248 rotates the rotor in the counterclockwise direction, with the rotational speed of the gyroscope rotor 274 and therefore the moment of inertia of the gyroscope rotor being directly proportional to the speed of rotation of the input power shaft 200 (and the magnitude of the input torque 240). Because of the resistance of the output power shaft 244, the gear 412 will revolve around gear 230, the various gears in the gear assembly will in turn cause the first and second gear shafts to rotate, and the entire gear assembly (including master gear 400) to rotate about the secondary drive shaft 236 and the output power shaft 244. Rotation of the master gear 400 is resisted by the gear 268 attached to the gyro shaft 264, with the magnitude of the resisting torque exerted on the master gear 400 by the gear 268 being directly proportional to the magnitude of the input torque 240 (and the rotor speed and moment of inertia) as discussed above. The resistance to rotation of the master gear 400 causes a portion of the input torque 240 to be transferred through the gear assembly to the output power shaft 244 and therefore to the axle 312. As the magnitude of the input torque increases or decreases, the magnitude of the torque applied to the axle 312 will increase or decrease proportionally. In this manner, the transmission is infinitely variable over a wide range of input torques (or horsepowers). Stated another way, if proper gear ratios are used, the source of torque (e.g., a motor) can remain in the power band throughout acceleration and power will not be compromised (i.e., dissipated) due to the shifting of gears. If the source of torque is allowed to remain at a peak performance level, then fuel consumption would be drastically reduced in normal every day driving.

In yet another embodiment, the transmission system utilizes a 1- or 2-° of freedom gyroscope as the gyroscopic member. The 1- or 2-° of rotational freedom gyroscopes permits the transmission to utilize the phenomenon of precession to cause rotation of the rotating gear assembly 212.

Figure 1:
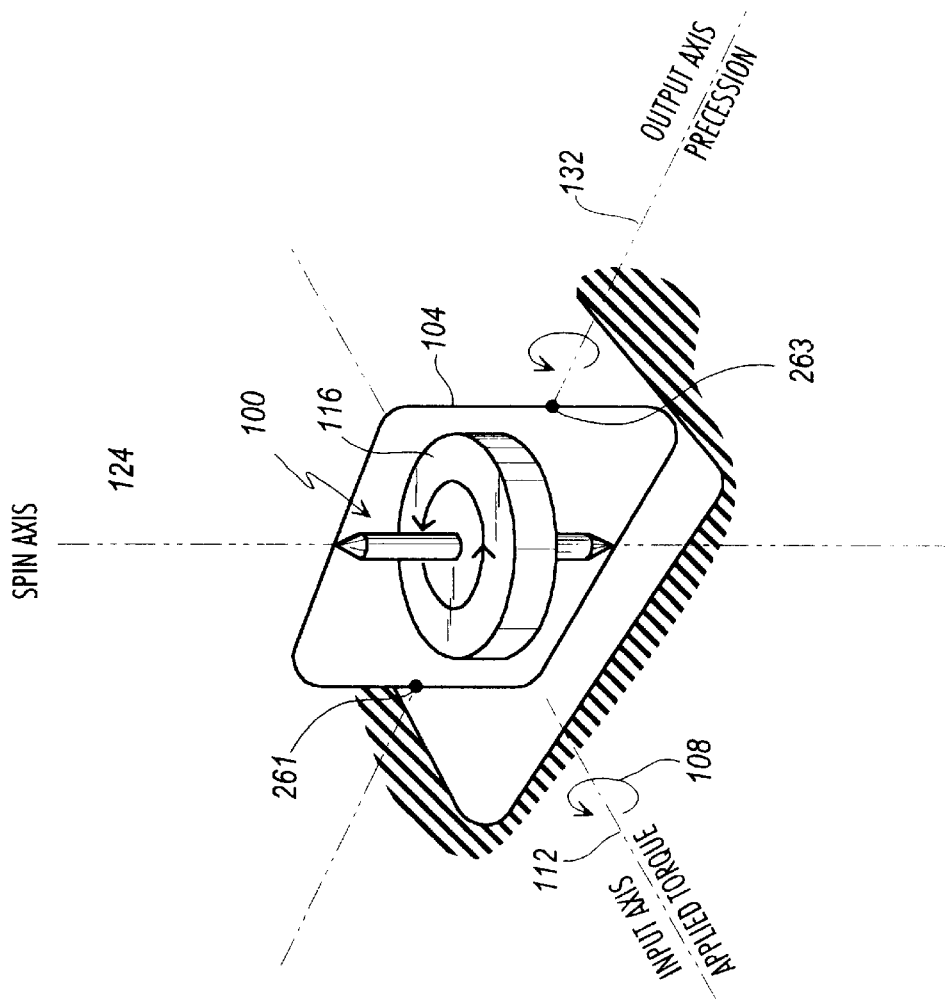
FIG. 1 depicts one embodiment of the concept of gyroscopic precession that may be employed as part of the transmission system of the present invention.

One or more frames are positioned concentrically within the opposing members of frame 260 to provide subframe(s) having one or more degrees of freedom. In one configuration, the device of FIG. 1 is positioned between the opposing members with the attachment points 261 and 263 being bearing attachments to the opposing members.

The principles underlying the phenomenon of precession are explained with reference to FIG. 1. FIG. 1 depicts a gyroscope 100 mounted in a frame 104 having a single degree of rotational freedom, also known as a rate gyroscope. As will be appreciated, the transmission system can use a gyroscope having more than one degree of freedom. When an input torque 108 is applied about an input axis 112 and the speed of the rotor 116 is held constant, the angular momentum of the rotor 116 about the axis of rotation 124 can be changed only by rotating the projection of the axis of rotation 124 about the input axis 112; that is, the rate of rotation of the axis of rotation 124 about the output axis 132 is proportional to the applied torque 108. This relationship may be stated mathematically by the following equation:

$$T = I\omega_r \Omega$$

where

T is the torque.

I is the moment of inertia of the gyroscope rotor 116 about the axis of rotation 124.

$\omega_r$ is the rotational speed of the gyroscope rotor 116.

$\Omega$ is the angular velocity of the axis of rotation 124 (or frame 104) about the output axis 132.

The foregoing description of the present invention has been presented for purposes of illustration and description. Furthermore, the description is not intended to limit the invention to the form disclosed herein. Consequently, variations and modifications commensurate with the above teachings, in the skill or knowledge of the relevant art, are within the scope of the present invention. By way of example, the invention includes transmission systems using more or fewer shafts and/or gears, different configurations of shafts or gears to those set forth above, or more than one gyroscope assembly to increase the resistance of the gyro gear to rotation or a gyroscope assembly having more than one rotor. The embodiments described here and above are further intended to explain best modes for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A transmission system disposed between a power source and a power load, comprising:
   (a) first and second input power shafts, the first input power shaft engaging the second input power shaft;
   (b) a frame disposed to be rotated about a third shaft, the frame including a gyroscopic member, the gyroscopic member being rotated about an axis of rotation when torque is applied to the first input power shaft, the axis of rotation being transverse to a longitudinal axis of the third shaft; and
   (c) a gear assembly rotatably disposed about an output power shaft, the gear assembly being engaged with the output power shaft, the second input power shaft, and the third shaft such that rotation of the gyroscopic member about the axis of rotation resists rotation of the frame by the gear assembly, thereby causing at least a portion of the torque applied to at least one of the first and second input power shafts to be transferred to the output power shaft, wherein the gear assembly includes at least a first gear and a plate and at least a fourth shaft and a fifth shaft are rotatably mounted on the first gear and the plate.

2. The transmission system of claim 1, wherein the gyroscopic member includes one or more discrete rotatable disks.

3. The transmission system of claim 1, wherein the gear assembly includes a plurality of interlocked gears and a plurality of parallel shafts.

4. The transmission system of claim 3, wherein the first gear is at a proximal end of the gear assembly and the plate is at a distal end of the gear assembly, the first gear and plate being rotatably mounted on different shafts.

5. The transmission system of claim 4, wherein the first gear is rotatably mounted on the second input power shaft, the plate is rotatably mounted on the output power shaft, and the third shaft is attached to a second gear that engages the first gear.

6. The transmission system of claim 5, wherein a third gear is attached to the second input power shaft, the third gear engages a fourth gear mounted on one of the fourth and fifth shafts, a fifth gear attached to the one of the fourth and fifth shafts engages a sixth gear on the other of the one of the fourth and fifth shafts, and a seventh gear attached to the other of the one of the fourth and fifth shafts engages an eighth gear mounted on the output power shaft.

7. The transmission system of claim 5, wherein the second gear is smaller in diameter than the first gear.

8. The transmission system of claim 7, wherein the gear ratio between the first gear and the second gear is at least about 1:2.

9. The transmission system of claim 6, wherein the first gear is larger than the second gear, the third gear is smaller than the fourth gear, the fourth gear is smaller than a fifth gear, and the sixth gear is larger than the seventh gear.

10. A transmission system, comprising:
    (a) a frame mounting a gyroscopic member, the gyroscopic member disposed to be rotated about an axis of rotation in response to rotation of an input power shaft, when torque is applied to the input power shaft; and
    (b) a gear assembly rotatably engaged with an output power shaft and the input power shaft, such that the gear assembly is rotatable about the output power shaft in response to a power load on the output power shaft, wherein rotation of the gyroscopic member about the axis of rotation resists rotation of the gear assembly, thereby causing at least a portion of the torque applied to the input power shaft to be transferred to the output power shaft, wherein the gear assembly includes at least a first gear and a plate and at least a fourth shaft and a fifth shaft are rotatably mounted on the first gear and the plate.

11. The transmission system of claim 10, wherein the gyroscopic member includes only one rotatable disk.

12. The transmission system of claim 10, wherein the gear assembly includes a plurality of interlocked gears and a plurality of parallel shafts.

13. The transmission system of claim 12, wherein the first gear is at a proximal end of the gear assembly and the plate is at a distal end of the gear assembly, the first gear and plate being rotatably mounted on different shafts.

14. The transmission system of claim 13, wherein the first gear is rotatably mounted on the input power shaft, the plate is rotatably mounted on the output power shaft, and a third shaft is attached to a second gear that engages the first gear.

15. The transmission system of claim 14, wherein a third gear is attached to the input power shaft, the third gear engages a fourth gear mounted on one of the fourth and fifth shafts, a fifth gear attached to the one of the fourth and fifth shafts engages a sixth gear on the other of the one of the fourth and fifth shafts, and a seventh gear attached to the other of the one of the fourth and fifth shafts engages an eighth gear mounted on the output power shaft.

16. The transmission system of claim 15, wherein the gear ratio between the first gear and the second gear is at least about 1:2.

17. The transmission system of claim 15, wherein the first gear is larger than the second gear, the third gear is smaller than the fourth gear, the fourth gear is smaller than a fifth gear, and the sixth gear is larger than the seventh gear.

18. A method for transferring torque from an input power shaft to an output power shaft, comprising:
    (a) applying torque to the input power shaft;
    (b) rotating a gyroscopic member in response to the applying step, the gyroscopic member having an axis of rotation and being mounted on a frame member;
    (c) rotating a gear assembly in response to the applying step, the gear assembly engaging the input power shaft and the output power shaft, wherein the gear assembly includes at least two shafts rotatably mounted between a pair of common surfaces; and
    (d) rotating the frame member and the axis of rotation of the gyroscopic member about a power transfer shaft engaging the gear assembly, wherein rotation of the axis of rotation resists rotation of the gear assembly, whereby at least a portion of the torque is applied to the output power shaft; wherein in the rotating step (b) the gyroscopic member is rotated by the engagement of a first gear fixedly attached to the input power shaft with a second gear attached to the gyroscopic member and in the rotating step (c) the gear assembly is rotated by the engagement of a third gear operatively engaged with the input power shaft with a fourth gear attached to one of the at least two shafts, wherein one of the common surfaces is part of a fifth gear, and in rotating step (c) the frame member and axis of rotation are rotated by the engagement of a sixth gear attached to the power transfer shaft with the fifth gear.

19. The method of claim 18, wherein rotating step (d) includes:
    (e) rotating the at least two shafts, which are parallel to one another, to translate rotation of the input power shaft to rotation of the output power shaft.

\* \* \* \* \*